US008449303B2

(12) United States Patent
Fogarty

(10) Patent No.: US 8,449,303 B2
(45) Date of Patent: May 28, 2013

(54) METHODS AND APPARATUS ENABLING MEETING NOTES TO BE INSCRIBED ON ELECTROSTATIC FILM AND RETAINED

(76) Inventor: Michael W. Fogarty, Alexandria, VA (US)

( * ) Notice: Subject to any disclaimer, the term of this patent is extended or adjusted under 35 U.S.C. 154(b) by 290 days.

(21) Appl. No.: 12/965,275

(22) Filed: Dec. 10, 2010

(65) Prior Publication Data

US 2011/0143329 A1 Jun. 16, 2011

Related U.S. Application Data

(60) Provisional application No. 61/282,071, filed on Dec. 11, 2009.

(51) Int. Cl.
*G09B 25/00* (2006.01)
(52) U.S. Cl.
USPC ............................................................ 434/365
(58) Field of Classification Search
USPC ............................................................ 434/365
See application file for complete search history.

(56) References Cited

U.S. PATENT DOCUMENTS

| | | | | |
|---|---|---|---|---|
| 1,485,050 A * | 2/1924 | Phillips | ........................ | 220/326 |
| 1,742,821 A * | 1/1930 | Nichols | ........................ | 312/351 |
| 1,966,276 A * | 7/1934 | Armstrong | ........................ | 40/514 |
| 2,223,560 A * | 12/1940 | Friedlaender | ........................ | 402/4 |
| 2,318,192 A * | 5/1943 | Boelema, Jr. | ........................ | 281/31 |
| 2,904,157 A * | 9/1959 | Smith | ........................ | 400/93 |
| 3,559,325 A * | 2/1971 | Webster | ........................ | 42/55 |
| 4,061,224 A * | 12/1977 | Fuhri | ........................ | 206/1.7 |
| 4,717,023 A * | 1/1988 | Oprean | ........................ | 206/459.5 |
| 5,010,671 A * | 4/1991 | Stonehouse | ........................ | 40/594 |
| 5,207,519 A * | 5/1993 | Debreczenyi | ........................ | 400/202.4 |
| 5,207,581 A * | 5/1993 | Boyd | ........................ | 434/412 |
| 5,275,321 A * | 1/1994 | Manu et al. | ........................ | 225/45 |
| 5,388,689 A * | 2/1995 | Kroop et al. | ........................ | 206/214 |
| 6,098,793 A * | 8/2000 | Jaksha | ........................ | 206/214 |
| 6,981,593 B1 * | 1/2006 | Klodt | ........................ | 206/541 |
| 7,000,520 B2 * | 2/2006 | Nichols et al. | ........................ | 83/578 |
| 7,776,788 B2 * | 8/2010 | Tetrault | ........................ | 503/201 |
| 2004/0081844 A1 * | 4/2004 | Bharti et al. | ........................ | 428/523 |
| 2010/0260534 A1 * | 10/2010 | Tetrault | ........................ | 402/4 |
| 2011/0212421 A1 * | 9/2011 | Schwendimann et al. | ........................ | 434/85 |

* cited by examiner

*Primary Examiner* — Kurt Fernstrom
*Assistant Examiner* — Dolores Collins
(74) *Attorney, Agent, or Firm* — Merchant & Gould

(57) ABSTRACT

A meeting attendee brings into a meeting room a kit which includes a container possessing a supply cylinder on which conventional electrostatic or electret film/paper is wound, a retention cylinder, and, optionally, writing implements. A sheet of the electrostatic film is unwound from the supply roll and is applied to a vertical surface to which it clings by electrostatic attraction. The exposed side of the sheet is written-on by conventional writing tools. Following the meeting, one or more of the sheets is peeled from the surface and retained by being wound up and placed into the retention cylinder. The retention cylinder can then be removed from the meeting room within the container or separately therefrom.

7 Claims, 4 Drawing Sheets

METHODS AND APPARATUS ENABLING MEETING NOTES TO BE INSCRIBED ON ELECTROSTATIC FILM AND RETAINED

This application claims priority to U.S. Provisional Application No. 61/282,071, filed on Dec. 11, 2009, the contents of which are hereby incorporated by reference in its entirety.

BACKGROUND OF THE INVENTION

This disclosure relates to methods and apparatus for enabling attendees at a meeting to write information in such a manner that it is displayed to all attendees, and later conveniently retained for future reference.

In meetings and conferences, it is common for individuals to write information such as notes, numbers, drawings, etc. on a large surface, such as an erasable drawing board, or a large easel mounted pad, so that it can be seen by all present in the room. However, not all rooms in which meetings occur are equipped with such an erasable board, and it can be inconvenient to have to find and set up such equipment.

Moreover, if it is desired to memorialize information written on an erasable board during the meeting, it is necessary to separately make a hand copy, which is inconvenient and possibly impossible if the information has already been erased from the board. Erasable writing boards are available which incorporate a copier, but they are relatively expensive and not easily transportable.

In lieu of erasable boards, easel-mounted paper pads or flit charts can be used which enable the written-on sheets to be later removed and retained, but that requires that the large pad and easel be accessible and that personnel to be on-hand to transport it and set it up in the meeting room. Oftentimes, the desire to write on such a pad occurs spontaneously during the meeting, and the time necessary to locate and set up an easel (or an erasable board) interrupts the flow of the meeting.

In U.S. Pat. No. 5,207,581 there is disclosed an apparatus comprising a box containing a roll of electrostatic or electret film, which box has attachment devices enabling the box to be mounted on a plate or a wall to enable a sheet of the film to be unwound and mounted on the plate or wall by electrostatic attraction. Notes can be written on the sheet, but there is no convenient way to retain the written-on sheets.

It would be desirable to enable information to be written and displayed during a meeting and thereafter be retained in a way that utilizes apparatus which is readily accessible, relatively inexpensive and convenient to transport, set-up and handle.

SUMMARY OF THE INVENTION

Described herein is a method and apparatus in which an attendee at a meeting can write information such as notes, comments, figures, etc. in a way that is visible to all attendees and which can be easily retained, using apparatus that is inexpensive and easily transportable. In practice, a user brings into the meeting room a kit which includes a roll of electrostatic or electret film/paper, one or more retention cylinders, and, optionally, writing implements such as magic markers. A sheet of the electrostatic film is unwound from the roll and applied to a vertical surface, such a wall or separate board, so that the sheet clings to the surface by means of electrostatic attraction. The exposed side of the sheet can then be written-on by conventional writing tools, such as the magic markers. One or more of such sheets can be written-on during the meeting. Once the meeting is finished, the written-on sheet(s) can be peeled from the surface and retained by being rolled up and inserted into the retention cylinder. The retention cylinder can then be removed from the meeting room within the container or separately there from.

The preferred container is an inexpensive box having a carrying handle and includes a plurality of compartments for containing the roll of electrostatic film, the retrieval cylinder and the optional writing implements. The box and the retention cylinder can be formed of inexpensive cardboard.

If the electrostatic film is in the form of a continuously wound web, the container includes a cutter enabling sheets of the film to be cut.

DETAILED DESCRIPTION OF THE INVENTION

Figure 1:
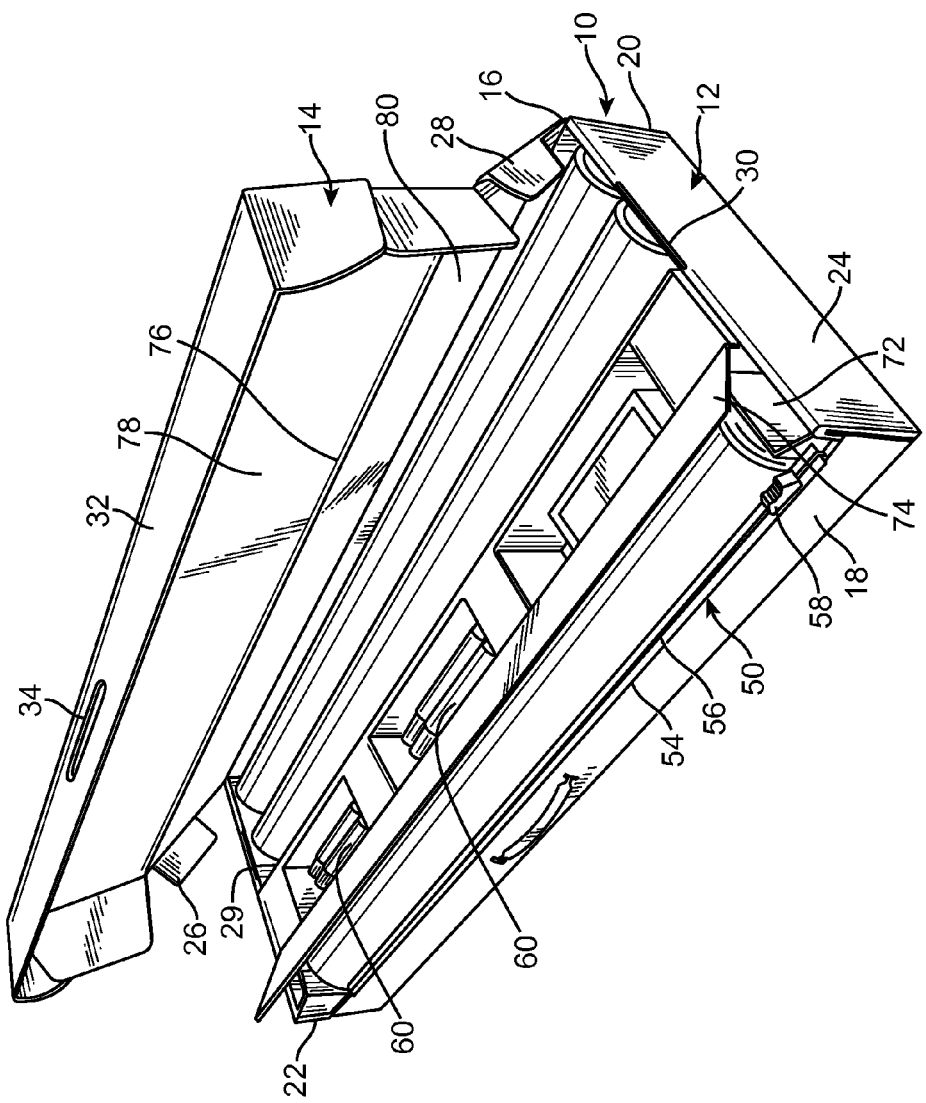
FIG. 1 is a perspective view of a kit according to a preferred embodiment of the invention, with a lid of the kit in an open state.
Figure 2:
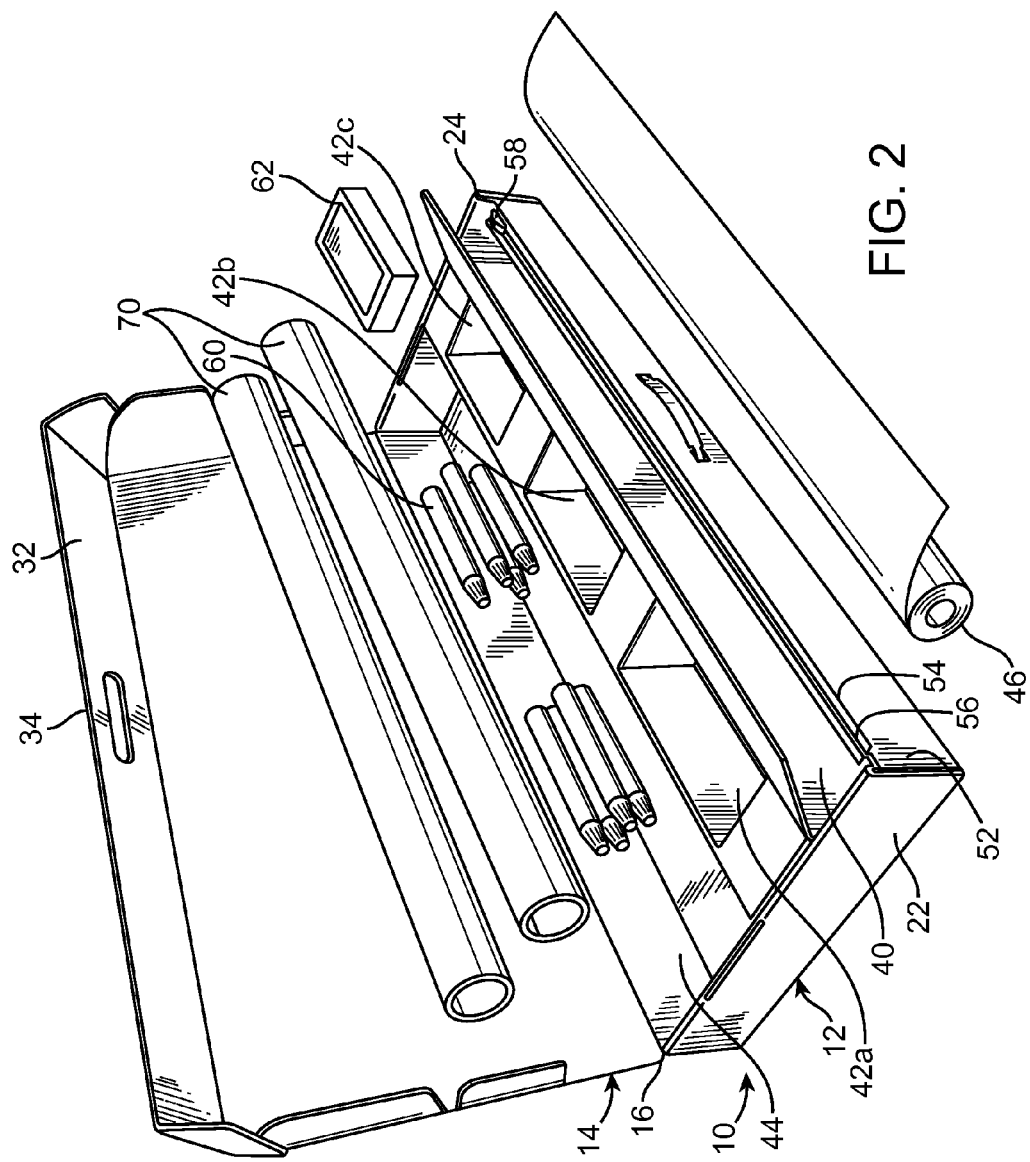
FIG. 2 is an exploded perspective view similar to FIG. 1, showing the components of the kit.
Figure 3:
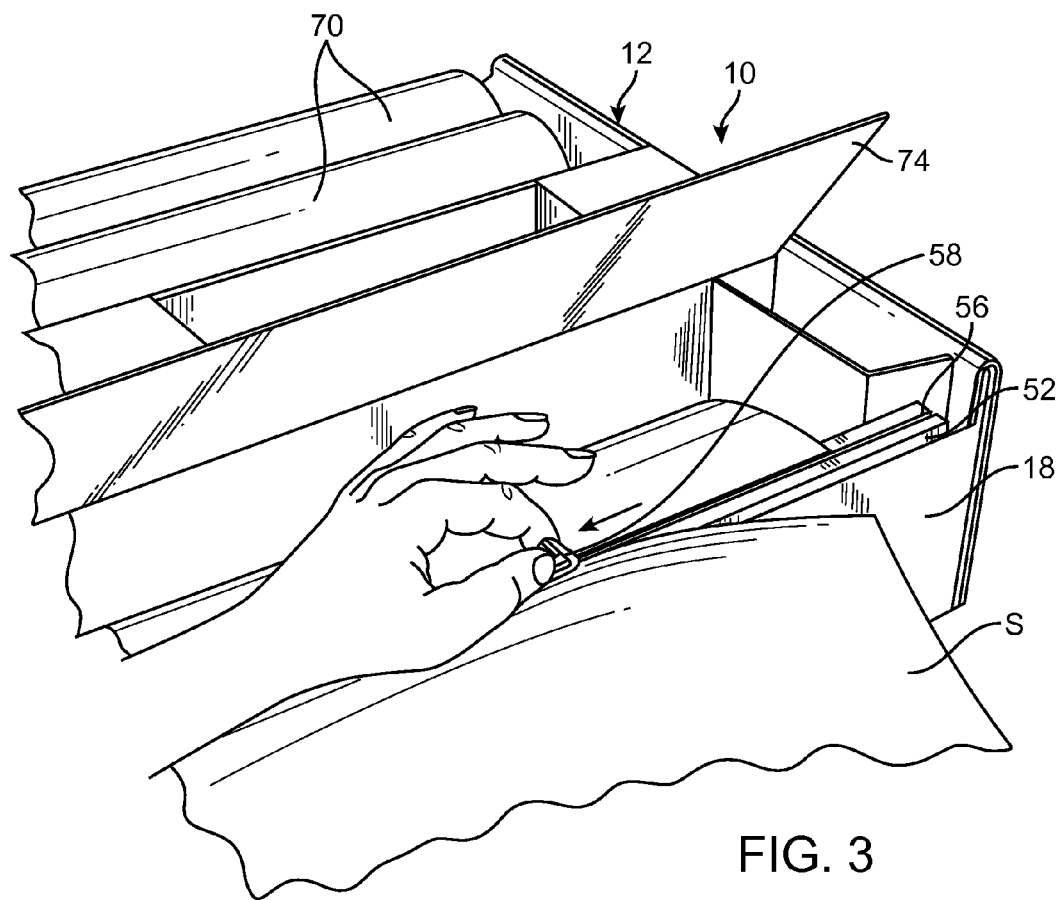
FIG. 3 is a fragmentary view of the kit, showing a sheet of electrostatic paper being cut.

A preferred kit, shown in FIGS. 1 and 2, comprises a container 10, formed for example of cardboard, and including a base 12 and a lid 14. The base and lid are preferably formed from a one-piece blank so the lid forms an integral hinge 16 with the base. The base has four sides, i.e., front and back sides 18, 20 and two lateral sides 22, 24. The front side 18 carries a loosely mounted handle 19 formed for example of plastic. The lid 14 is hinged to an upper edge of the back side 20 of the base and can be swung to a position overlying the base to close the interior of the base. The lid includes depending tabs 26, 28 which can be inserted into respective slots 29, 30 formed in upper edges of the lateral sides 22, 24 of the base to achieve alignment between the lid and the base. A front side 32 of the lid overlies the front side 18 of the base when the lid is closed and includes a slotted opening 34 for receiving the handle to enable the lid to be secured in a closed position (see FIG. 4).

The base 12 includes a plurality of compartments 40, 42*a*, 42*b*, 42*c*, and 44. The compartment 40 is situated adjacent the front side 18 and contains a roll 46 of conventional electrostatic or electret film/paper. The roll 46 could contain individual sheets of electrostatic film of a predetermined length, or a continuous web of the film. In case the film is in the form of the continuous web, the front side of the container would carry a conventional cutter enabling a sheet of desired length to be cut. The cutter could be in the form of a conventional serrated metal strip, or, as shown in the figures, a slide-type of cutter 50. The cutter 50 includes a plate 52 located adjacent and parallel to the front side 18 and formed, for example, of cardboard. That plate preferably contains openings, not shown, in which respective ends of the handle 19 are secured. At its upper edge, the plate carries a strip 54 formed for example of plastic, in which a channel 56 is formed. Mounted for sliding movement along the strip 54 is a cutting slide 58 which carries a cutter blade (not shown} that extends into the channel 56. When a section S of the web of film is unwound from the roll so as to overlie the strip, the cutting slide is slid across the strip to cut the film.

The compartments 42*a* and 42*b* can contain writing implements, such as magic markers 60 or the like which are suitable for writing on the film. The compartment 42c could contain an eraser 62. The compartment 44 contains one or more retention cylinders 70, preferably formed of cardboard, onto which written-on sheets of the film can be wound and stored.

The compartment 40 in which the roll 46 is disposed can include side walls 72 at its opposite ends (see FIG. 1) on which respective tabs (hot shown) are formed that extend toward one another to fit into respective ends of the preferably-hollow roll 46 to form an axle structure about which the roll can rotate. A hinged cover 74 is preferably provided to overlie the compartment 40. The lid 14 preferably includes an intermediate integral hinge 76 dividing the lid into front and rear sections 78, 80, wherein the front section would overlie only the compartment 40 in which the roll 46 is disposed. Thus, it is possible to unfold the front portion of the lid to expose only the roll 46.

Figure 4:
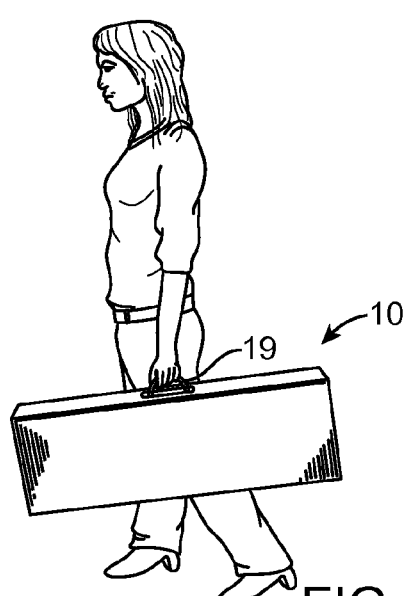
FIGS. 4-7 respectively depict steps involved in the manner of using the kit.
Figure 5:
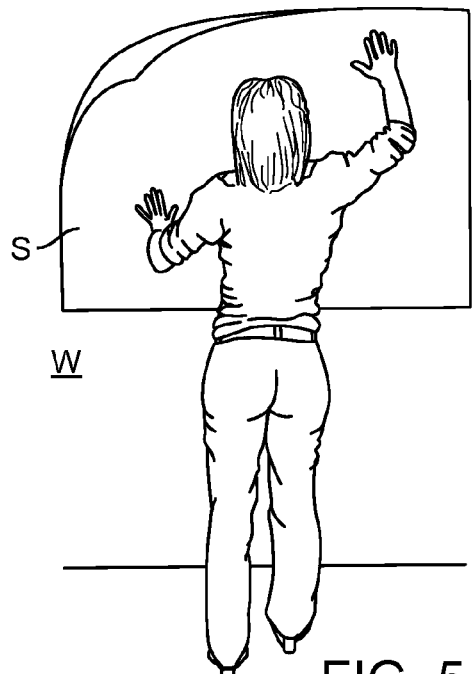
Figure 6:
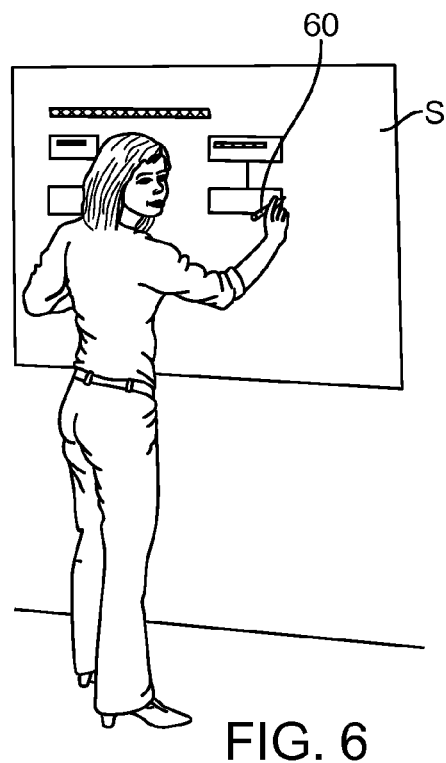

In practice, a user carries the kit into a meeting room as shown in FIG. 4. If it becomes desirable during the meeting to write information in such manner that it is displayed to all attendees, a sheet of electrostatic film is removed from the roll 46 and applied to a surface such as a vertical wall W (or optionally a separate board) to which it clings by electrostatic attraction (see FIG. 5). If the film is in the form of a continuous web, a sheet of desired length is unwound and cut as described above. Then, using one or more of the writing tools 60, information is written on the exposed side of the film (see FIG. 6). As many sheets as necessary are removed from the supply cylinder and written on.

Figure 7:
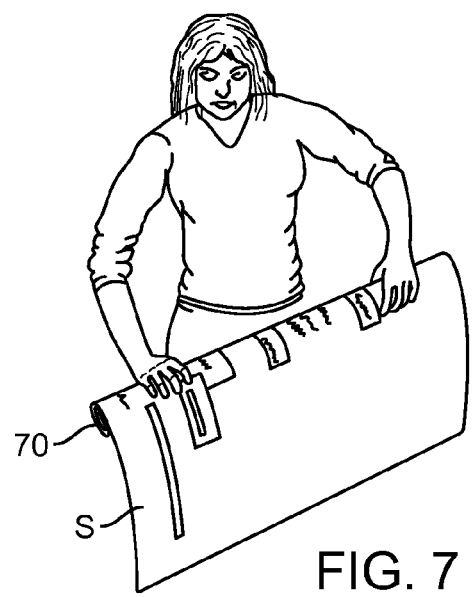

Later, if it is desired that one or more of the sheets be retained, the sheet(s) can be wound up and inserted into one or more of the retention cylinders as shown in FIG. 7. The retention cylinder(s) can then be removed from the meeting room within the container, or separately therefrom. Preferably, the retention cylinder is provided with a removable lid (not shown) for enabling one end thereof to be opened and closed. As an alternative to placing the written-on sheets into the retention cylinder, the sheets could be wound around the outer surface of the retention cylinder.

It will be appreciated that the above-described method and apparatus provide an economical and convenient way of enabling information to be displayed at a meeting and thereafter retained for future reference.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method of enabling a meeting attendee to write information which is visible to other attendees, the method comprising:
   providing a kit in the meeting room, wherein the kit comprises a roll of electrostatic film from which sheets of the film can be cut by a slide-type of cutter, with the roll being housed in a container with the front side of the container carrying the slide-type cutter enabling a sheet of desired length to be cut; writing implements for writing on the sheets of film, an eraser for erasing writing on the sheets of film when needed, and a retention cylinder for retaining the written-on sheets;
   unrolling a sheet of electrostatic film from the roll and cutting a sheet of desired length with the slide-type cutter;
   applying the sheet to a vertical surface to which it clings by electrostatic attraction;
   writing on the sheet and erasing any writing with the eraser in the kit if needed;
   peeling the sheet from the vertical surface; and
   retaining the written-on sheet in the retention cylinder.

2. The method of claim 1, wherein the writing implements are magic markers.

3. The method of claim 1, wherein the vertical surface is a wall in the meeting room.

4. The method of claim 1, wherein the roll of electrostatic film is continuous.

5. The method of claim 1, wherein the container housing the roll of electrostatic film has a hinged cover.

6. The method of claim 5, wherein the hinged cover comprises an intermediate integral hinge dividing the cover into front and rear sections.

7. A method of claim 6, wherein the front section contains only the roll of electrostatic film.

* * * * *